Patented Mar. 4, 1930

1,749,242

UNITED STATES PATENT OFFICE

WALTER DUISBERG, OF LEVERKUSEN, NEAR COLOGNE, AND WINFRID HENTRICH AND LUDWIG ZEH, OF WIESDORF, NEAR COLOGNE, GERMANY, ASSIGNORS TO GENERAL ANILINE WORKS, INC., OF NEW YORK, N. Y., A CORPORATION OF DELAWARE

DYESTUFFS WHICH ARE ALANINES OF THE ANTHRAQUINONE SERIES AND THEIR DERIVATIVES

No Drawing. Application filed January 16, 1926, Serial No. 81,798, and in Germany January 31, 1925.

This invention relates to dyestuffs which are alanines of the anthraquinone series, and their derivatives, and to the process of preparing the same.

We have found that alanines of the anthraquinone series and their derivatives are obtained when halogenated propionic acids or their derivatives or substitution products are allowed to react with aminoanthraquinones or their derivatives and substitution products with or without a diluting material and advantageously in the presence of an acid-combining substance. The acid-combining substance may be omitted and good results obtained.

The reaction proceeds smoothly and produces materials whose alkali-metal salts are principally adapted for dyeing animal fibres and artificial materials such as acetate silk and are to be used as starting materials for new dyestuffs.

The same products may also be obtained from halogenated anthraquinones with alanines and their substitution products.

The following examples are given by way of illustration:

Example 1

22.3 parts by weight of 2-aminoanthraquinone, 21.6 parts by weight of β-chlorpropionic acid and 45 parts by weight of diethylaniline in 200 parts by weight of o-dichlorbenzol are heated to 140–150° C. until the dyestuff dissolves in sodium carbonate. After making the reaction mass distinctly alkaline, the diethylaniline and o-dichlorbenzol are removed by steam distillation and the anthraquinone-2-β-alanine is separated as the sodium salt or as the free acid. It dyes acetate silk orange-red and has the probable formula:

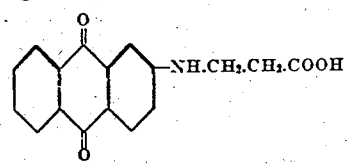

Example 2

23.8 parts by weight of 1,4-diaminoanthraquinone, 43.2 parts by weight of β-chlorpropionic acid and 50 parts by weight of pyridine are heated in 200 parts by weight of solvent naphtha to boiling with stirring until completion of the reaction. The 1-aminoanthraquinone-4-β-alanine formed is isolated as in Example 1. In this case, according to the choice of the reaction conditions, varying amounts of the more easily soluble and bluer colored anthraquinone-1,4-di-β-alanine are formed and may be separated from the mother liquors.

The dyestuff of this example dyes acetate silk violet.

Example 3

26.8 parts by weight of 1,4,5,8-tetraminoanthraquinone with a double amount of β-chlorpropionic acid are heated to 120–130° C. until the mixture is soluble in water. The melt is dissolved in not too much water so that the solution is weakly alkaline due to the addition of sodium carbonate. The blue β-alanine of 1,4,5,8-tetraminoanthraquinone is precipitated from the solution by means of sodium chloride. It dyes acetate silk greenish blue. It probably has the formula:

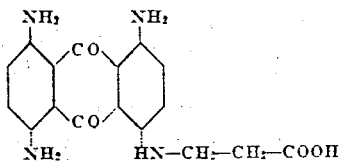

The dyestuffs made according to this invention are dark powders of a metallic luster which dissolve easily in water in the form of their alkali-metal salts yielding clear yellow to deep greenish blue solutions. They are likewise easily soluble in concentrated sulfuric acid forming colored solutions. Thus, for example, the alanine of 1,4,5,8-tetraminoanthraquinone yields a deep-brown solution, which if poured onto ice, gives a violet color which on addition of alkali produces a green-blue solution.

In the claims, by the terms "an alanine", "a propionic acid" and "an anthraquinone", we mean alanine, propionic acid and anthraquinone and their derivatives and substitution products.

We claim:

1. As new products anthraquinone-β-alanines of the general formula:

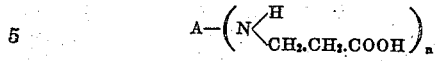

in which A stands for an anthraquinone residue and $n$ designates a whole number not greater than 4, which products are dark powders having a metallic luster, are easily soluble in water in form of their alkali-metal salts, yield clear yellow to deep greenish-blue solutions, are easily soluble in concentrated sulfuric acid forming colored solutions, dye artificial silk and wool from yellow to deep greenish-blue shades and are substantially identical with the products obtained by reacting halogenated propionic acids with aminoanthraquinones.

2. A dyestuff which is a β-alanine of 1.4.5.8-tetraminoanthraquinone, which probably has the constitutional formula:

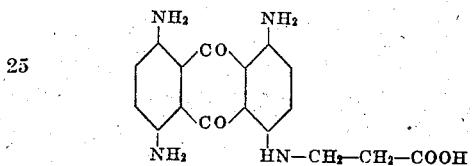

which is of a deep blue color with a metallic lustre, is soluble in water in the form of its alkali-metal salts, is soluble in concentrated sulfuric acid, and which dyes acetate silk greenish-blue.

3. Process of preparing alanines of the anthraquinones which comprises heating a propionic acid derivative with an anthraquinone derivative, one of these derivatives containing an amino group and the other a reactive halogen.

4. Process of preparing alanines of the anthraquinones which comprises heating a mixture comprising a halogenated propionic acid and an aminoanthraquinone.

5. Process of preparing alanines of the anthraquinones which comprises heating a mixture comprising β-chlorpropionic acid and an aminoanthraquinone.

6. Process of preparing alanines of the anthraquinones which comprises heating a mixture comprising β-chlorpropionic acid and an α-aminoanthraquinone.

7. Process of preparing the dyestuff of claim 2 which comprises heating a mixture comprising 1.4.5.8-tetraminoanthraquinone and β-chlorpropionic acid.

In testimony whereof, we affix our signatures.

WALTER DUISBERG.
WINFRID HENTRICH.
LUDWIG ZEH.